United States Patent Office 3,361,580

Patented Jan. 2, 1968

3,361,580

ELECTROLESS COPPER PLATING

Frederick W. Schneble, Jr., Oyster Bay, Rudolph John Zeblisky, Hauppague, John Francis McCormack, Roslyn Heights, and John Duff Williamson, Miller Place, N.Y., assignors to Day Company, N.V., a Curacao corporation No Drawing. Filed June 18, 1963, Ser. No. 288,633

29 Claims. (Cl. 106—1)

This application is a continuation-in-part of copending application U.S. Ser. No. 26,401 filed May 3, 1960, now U.S. Patent 3,095,309.

The present invention relates to an improved process for electroless or autocatalytic plating of copper, and to improved baths for carrying out such processes.

An object of the present invention is to improve the stability of autocatalytic copper baths so as to render them operational over long periods of time.

Another object of this invention is to avoid autosensitization of non-catalytic areas of non-metallic surfaces heretofore caused by protracted immersion of such surfaces in autocatalytic copper baths.

It has been discovered that these and other objects may be achieved by adding to autocatalytic copper baths a sulfur compound which is capable of forming a stable but dissociable chelate with cuprous ion.

In the past, difficulty had been experienced in plating from autocatalytic copper baths on restricted areas of non-metallic surfaces. With non-metallic substrates, there is a tendency for the non-sensitized areas of the substrate following prolonged immersion in the autocatalytic copper baths to become sensitized and to receive random spot deposits of copper. As will be readily appreciated, deposition of copper in areas of the substratum where copper is not desired raises havoc with control techniques in the preparation, for example, of printed circuits.

Additionally, with conventional autocatalytic copper baths, difficulty has been experienced in the past with deposition of copper or non-metallic walls of containers housing the bath following prolonged exposure of the containers walls to the bath. This leads to inefficiency of the bath, and also causes difficulty with the control of the plating operation, since one of the methods of controlling autocatalytic copper baths is by calculating the amount of copper actually deposited on substrates. When the copper is deposited on the containing walls of the bath, such calculation obviously have little meaning.

The baths of the present invention are remarkable in the sense that they will deposit copper on non-metallic surfaces only in those areas which have been pre-treated to provide catalytically active sites, as described for example hereinbelow. These baths have a remarkable capacity for distinguishing non-metallic areas which have not been catalytically sensitized from those which have, and for depositing copper only on the latter areas. Even though a non-pretreated, non-metallic surface, including the housing walls of the baths, may be exposed to the baths of this invention for prolonged periods of time, random deposition on such areas does not occur or is substantially eliminated.

The reason why non-pretreated, non-metallic surface areas when exposed to autocatalytic copper baths become sufficiently active to promote a deposit of copper in spots is not really understood. Without wishing to be limited to this explanation, one theory to explain this phenomenon is that a non-activated plastic surface contains small pores or pit holes. Upon prolonged exposure to an autocatalytic copper bath, hydrogen gas gradually accumulates in the pores and pits, and the accumulated hydrogen eventually acts as a catalytic site for the autocatalytic copper bath. As a result copper deposits in the areas of the pits or pores, thereby causing problems with the plating process as described hereinabove.

Sulfur compounds and in particular divalent sulfur compounds of the type described in addition to markedly improving the stability of the bath, also substantially eliminate the random, spot deposits of copper on non-sensitized, non-metallic surfaces. Although the function of sulfur in substantially eliminating unwanted copper deposits on non-sensitized areas is not clearly understood, with the baths of this invention hydrogen either does not accumulate in the pits or pores of the non-sensitized plastic or non-metallic surface areas, or alternatively, if the hydrogen does accumulate in such areas, it by itself is not sufficient to promote reduction of the baths in those areas so as to produce spot deposits of copper.

Among the organic sulfur compounds that may be used in practicing the invention are the following: aliphtic sulfur-nitrogen compounds, such as thiocarbamates, e.g., thiourea; 5-membered heterocyclics containing S–N in the 5-membered ring, such as thiazoles and iso-thiazoles, e.g., 2-mercapto benzol thiazole and the like; dithiols, e.g., 1,2-ethanedithiol and the like; 6-membered heterocyclics containing S–N in the ring, such as thiazines, e.g., 1,2-benzisothiazine, benzothiazine, and the like; thioamino acids, such as methionine, cystine, cysteine, and the like; thio derivatives of alkyl glycols, such as 2,2′-thiodiethanol, dithiodiglycol, and thioglycollic acid, and the like. Among the inorganic sulfur compounds may be mentioned: alkali metal sulfides, e.g., sodium sulfide, potassium sulfide, sodium polysulfide, potassium polysulfide; alkali metal thiocyanates, such as sodium and potassium thiocyanates; and alkali metal dithionates, such as sodium and potassium dithionate.

The foregoing sulfur compounds are merely typical of sulfur compounds which are capable of stabilizing autocatalytic copper baths such as taught herein.

The amount of sulfur compound required is a small effective amount and will vary, depending upon the particular compound used, from a trace to 300 parts per million (p.p.m.) or more. For most sulfur compounds, 1 p.p.m. will be the upper limit, and about 0.001 p.p.m. the lower limit. A good working limit for most sulfur compounds is between about 0.01 and 0.2 p.p.m.

It should be emphasized however that the amount of sulfur compound will vary with the nature and activity of the compound. The upper limit of the sulfur compound is an amount which will stop the bath, i.e., render it non-autocatalytic. The lower limit is that amount which will be effective in producing results described herein.

Typical autocatalytic copper baths which may be modified as taught herein are alkaline aqueous solutions comprising water soluble copper salts, such as cupric sulfate, chloride, nitrate, and acetate; a complexing agent for cupric ion; and an active reducing agent, such as formaldehyde.

Rochelle salts, the sodium salts (mono-, di-, tri, and tetrasodium) salts of ethylenediaminetetraacetic acid, nitrilotriacetic acid and its alkali salts, gluconic acid, gluconates, and triethanolamine are preferred as cupric ion complexing agents, but commercially available glucono-δ-lactone and modified ethylenediamineacetates are also useful, and in certain instances give even better results than the pure sodium ethylenediaminetetraacetates. One such material is N - hydroxyethylethylenediaminetriacetate. Other materials suitable for use as cupric complexing agents are disclosed in U.S. Patent Nos. 2,938,805, 2,996,-408, 3,075,855 and 3,075,856.

The quantities of the various ingredients in the bath are subject to wide variation within certain ranges which may be defined as follows:

| | |
|---|---|
| Copper salt | 0.002 to 0.60 mole. |
| Formaldehyde | 0.03 to 1.3 moles. |
| Cupric ion complexing agent | 0.7 to 2.5 times the moles of copper. |
| Sulfur compound | Less than 300 p.p.m. |
| Alkali metal hydroxide | Sufficient to give a pH of 10.0 to 14.0. |
| Water | Sufficient to make 1 liter. |

The sodium salts are preferred over the corresponding more costly potassium and other alkali metal salts in the baths of this invention.

Cupric sulfate is the preferred copper salt but other soluble copper salts may be used, such as the nitrate, chloride, and acetate, as has already been indicated.

More preferably, the plating baths of the present invention are compounded within more narrow limits than set forth immediately above, and the preferred embodiments comprise:

| | |
|---|---|
| A soluble cupric salt, preferably cupric sulfate | 0.002 to 0.2 mole. |
| Alkali metal hydroxide, preferably sodium hydroxide to give | pH 10 to 13. |
| Formaldehyde | 0.06 to 0.50 mole. |
| Cupric ion complexing agent | 0.001 to 0.60 mole, and usually at least about 10% molar excess based on the amount of cupric salt employed. |
| Cyanide compound | 0.00005 to 0.01 mole. |
| Sulfur compound | 0.001 p.p.m. to 1 p.p.m. |
| Water | Sufficient to make 1 liter. |

In considering these general formulae and the specific working formulae which are set forth below, it should be understood that as the baths are used up in plating, the cupric salt, and the formaldehyde reducing agent may be replenished from time to time, and also that it may be advisable to monitor the pH, and the cyanide and sulfur content of the bath, and to adjust them to their optimum value as the bath is used.

For best results, surfactants in an amount of less than about 5 grams per liter are added to the baths disclosed herein. Typical of such surfactants are organic phosphate esters, and oxyethylated sodium salts. Such surfactants may be obtained under the trade names Gafac RE 610 and Triton QS–15, respectively.

The baths are ordinarily used at temperatures between 25° to 65° C., although they may be used at lower temperatures or at even higher temperatures. As the temperature is increased, it is usual to find that the rate of plating is increased, and that the ductility of the deposit is increased to a slight extent. The efficiency of the copper recovery from the baths often exceeds 90 percent.

Typical examples of electroless copper deposition baths prepared following the teachings described herein are as follows:

EXAMPLE 1

| | | |
|---|---|---|
| Copper sulfate | grams | 5 |
| Trisodium N - hydroxyethylethylenediaminetriacetate (41% solution) | ml | 15 |
| Formaldehyde (37%) | ml | 6 |
| Surfactant | gram | 1 |
| Sodium hydroxide | grams | 2 |
| Thiourea | mg./l | .01 |

Water to make 1 liter.

EXAMPLE 2

| | | |
|---|---|---|
| Copper sulfate | grams | 5 |
| Trisodium N - hydroxyethylethylenediaminetriacetate (41% solution) | ml | 15 |
| Potassium polysulfide | mg./l | .01 |
| Formaldehyde (37%) | ml | 6 |
| Surfactant | gram | 1 |
| Sodium hydroxide | grams | 2 |

Water to make 1 liter.

EXAMPLE 3

| | | |
|---|---|---|
| Copper sulfate | grams | 5 |
| Trisodium nitrilotriacetic acid (4% solution) | ml | 23 |
| 2-Mercapto benzol thiazole | mg | 0.07 to 0.1 |
| Formaldehyde (37%) | ml | 10 |
| Sodium hydroxide | grams | 2.1 |
| Surfactant | grams | 2.5 |

Water to make 1 liter.

EXAMPLE 4

| | | |
|---|---|---|
| Copper sulfate | grams | 14 |
| Rochelle salt | grams | 70 |
| Sodium hydroxide | grams | 20 |
| Formaldehyde (37%) | ml | 40 |
| Thioglycollic acid | ml | .001 |
| Surfactant | gram | 1 |

Water to make 1 liter.

The surfactants in Examples 1 to 4 may be any of those described hereinabove.

In using the baths, the surface to be plated must be free of grease and other contaminating material.

Where a non-metallic surface is to be plated, the surface areas to receive the deposit should first be treated, as in conventional processes, with conventional sensitizing and seeding solution, such as stannouns chloride ($SnCl_2$), followed by treatment with a dilute solution of palladium chloride ($PdCl_2$).

Alternatively, extremely good sensitization is achieved by using a bath containing a mixture of stannous chloride and precious metal chloride, such as palladium chloride, the stannous chloride being present in stoichiometric excess, based on the amount of precious metal chloride.

Other ways of sensitizing non-metallic surfaces for reception of an electroless copper deposit from the baths described herein are disclosed in co-pending application Ser. No. 785,703, filed Jan. 8, 1959, by Frederick W. Schneble, Jr. and Rudolph J. Zebilsky, now abandoned but referred to in U.S. Patent No. 3,226,256 granted Dec. 28, 1965.

Where metal surface, such as stainless steel, is to be treated, it should be degreased, and then treated with acid, such as hydrochloric or phosphoric acid, to free the surface of any oxide.

Following pre-treatment and/or sensitization, the surface to be plated is immersed in the autocatalytic copper baths, and permitted to remain in the bath until a copper deposit of the desired thickness has been built up.

The invention in its broader aspects is not limited to the specific steps, processes and compositions shown and described but departures may be made therefrom within the scope of the accompanying claims without departing from the principles of the invention and without sacrificing its chief advantages.

What is claimed:

1. An electroless copper plating bath which comprises water, a water soluble copper salt, a complexing agent for cupric ion, a reducing agent, and a small effective amount of a stabilizing divalent sulfur compound, the amount of said sulfur compound being insufficient to prevent copper from depositing from the bath.

2. An aqueous alkaline electroless copper plating bath which comprises a water soluble copper salt, a complexing agent for cupric ion, a reducing agent, and a small effective amount of a stabilizing organic divalent sulfur compound, the amount of said sulfur compound being insufficient to prevent copper from depositing from the bath.

3. The electroless copper plating bath of claim 2 wherein said bath has a pH between 10 and 14 and wherein said sulfur compound is a member selected from the group consisting of compounds containing alkyl thioglycol, 2,2'-thiodiethanol, dithiodiethanol, dithiodiglycol and thioglycolic acid and mixtures thereof.

4. An aqueous alkaline electroless copper plating bath which comprises a water soluble copper salt, a complexing agent for cupric ion, a reducing agent, and a small effective amount of a stabilizing aliphatic mercaptan compound, the amount of said mercaptan being insufficient to prevent copper from depositing from the bath.

5. The electroless copper plating bath of claim 4 wherein said bath has a pH between 10 and 14 and wherein said mercaptan compound is a member selected from the group consisting of compounds containing alkyl dithiols and 1,2-ethane dithiol and mixtures thereof.

6. An aqueous alkaline electroless copper plating bath which comprises a water soluble copper salt, a complexing agent for cupric ion, a reducing agent, and a small effective amount of a stabilizing aliphatic compound containing divalent sulfur, and nitrogen, the amount of said compound being insufficient to prevent copper from depositing from the bath.

7. The electroless copper plating bath of claim 6 wherein said bath has a pH between 10 and 14 and wherein said compound is a member selected from the group consisting of compounds containing thiocarbamates, thiourea, thioamino acid, methionine, cystine and cysteine and mixtures thereof.

8. An aqueous alkaline electroless copper plating bath which comprises a water soluble copper salt, a complexing agent for cupric ion, a reducing agent, and a small effective amount of a stabilizing heterocyclic organic compound containing sulfur in the ring, the amount of said compound being insufficient to prevent copper from depositing from the bath.

9. An aqueous alkaline electroless copper plating bath which comprises a water soluble copper salt, a complexing agent for cupric ion, a reducing agent, and a small effective amount of a stabilizing six member heterocyclic organic compound containing sulfur in the ring, the amount of said sulfur compound being insufficient to prevent copper from depositing from the bath.

10. The electroless copper plating bath of claim 9 wherein said bath has a pH between 10 and 14 and wherein said sulfur compound is a member selected from the group consisting of compounds containing thiazine, 1,2-benzisothiazine and benzothiazine and mixtures thereof.

11. An aqueous alkaline electroless copper plating bath which comprises a water soluble copper salt, a complexing agent for cupric ion, a reducing agent, and a small effective amount of a stabilizing five member heterocyclic organic compound containing sulfur in the ring, the amount of said compound being insufficient to prevent copper from depositing from the bath.

12. The electroless copper plating bath of claim 11 wherein said bath has a pH between 10 and 14 and wherein said sulfur compound is a member selected from the group consisting of compounds containing thiazole and isothiazole and mixtures thereof.

13. An aqueous alkaline electroless copper plating bath which comprises a water soluble copper salt, a complexing agent for cupric ion, a reducing agent, and a small effective amount of a stabilizing organic thiocarbamate compound, the amount of said compound being insufficient to prevent copper from depositing from the bath.

14. An aqueous alkaline electroless copper plating bath which comprises a water soluble copper salt, a complexing agent for cupric ion, a reducing agent, and a small effective amount of a stabilizing thiocyanate compound, the amount of said compound being insufficient to prevent copper from depositing from the bath.

15. An electroless copper plating bath which comprises water, a water soluble copper salt, a complexing agent for cupric ion, a reducing agent, and a small effective amount of a stabilizing inorganic divalent sulfur compound, the amount of said compound being insufficient to prevent copper from depositing from the bath.

16. An aqueous alkaline electroless copper plating bath which comprises water, a water soluble copper salt, a complexing agent for cupric ion, a reducing agent, and a small effective amount of a stabilizing inorganic sulfide, the amount of said sulfide being insufficient to prevent copper from depositing from the bath.

17. The electroless copper plating bath of claim 16 wherein said bath has a pH between 10 and 14 and wherein said sulfide comprises alkali metal sulfide.

18. An aqueous alkaline electroless copper plating bath which comprises a water soluble copper salt, a complexing agent for cupric ion, a reducing agent, and a small effective amount of a stabilizing inorganic polysulfide compound, the amount of said compound being insufficient to prevent copper from depositing from the bath.

19. The composition of claim 18 wherein said sulfide compound comprises an alkali metal polysulfide.

20. The electroless copper plating bath of claim 18 wherein said bath has a pH between 10 and 14 and said polysulfide compound is a member selected from the group consisting of sodium polysulfide and potassium polysulfide and mixtures thereof.

21. An aqueous alkaline electroless copper plating bath which comprises water, a water soluble copper salt, a complexing agent for cupric ion, a reducing agent, and a small effective amount of a stabilizing inorganic thiocyanate, the amount of said thiocyanate compound being insufficient to prevent copper from depositing from the bath.

22. The electroless copper plating bath of claim 21 wherein said bath has a pH between 10 and 14 and said thiocyanate compound comprises alkali metal thiocyanate.

23. A process for preventing random deposition of copper on non-catalytically active areas and for electrolessly depositing copper on catalytically active areas of a nonmetallic substratum from an aqueous alkaline electroless copper plating bath solution comprising a water soluble copper salt; a complexing agent for cupric ion; and a reducing agent, which comprises adding to the solution a small effective amount of a stabilizing divalent sulfur compound the amount of said sulfur compound being insufficient to prevent copper from depositing from said bath and electrolessly depositing copper from said bath onto said catalytically active areas.

24. An aqueous alkaline electroless copper plating bath comprising a water soluble copper salt, a complexing agent for cupric ion, said complexing agent being a member selected from the group consisting of ethylenediaminetetraacetic acid, alkali metal salts of ethylenediaminetetraacetic acid, nitrilotriacetic acid, alkali metal salts of nitrilotriacetic acid, gluconic acid, triethanolamine, glucono-δ-lactone, N-hydroxyethylenediaminetetraacetic acid and alkali metal salts of N-hydroxyethylenediaminetetraacetic acid; a reducing agent and a small effective amount of a stabilizing divalent sulfur compound, the amount of said sulfur compound being insufficient to prevent copper from depositing from the bath.

25. A process for electroless copper plating which comprises immersing a receptive surface to be plated in an aqueous alkaline electroless copper plating bath comprising water, a water soluble copper salt, a complexing agent for cupric ion, said complexing agent being a member selected from the group consisting of ethylenediaminetetraacetic acid, alkali metal salts of ethylenediaminetetraacetic acid, nitrilotriacetic acid, alkali metal salts of nitrilotriacetic acid, gluconic acid, triethanolamine, glucono-δ-lactone, N-hydroxyethylenediaminetetraacetic acid and alkali metal salts of N-hydroxyethylenediaminetetraacetic acid; and a reducing agent, and maintaining in the bath a small effective amount of a stabilizing divalent sulfur compound, the amount of said sulfur compound being insufficient to prevent copper from depositing from the bath.

26. The composition of claim 17 wherein said sulfide comprises sodium sulfide.

27. The composition of claim 17 wherein said sulfide comprises potassium sulfide compound.

28. The composition of claim 22 wherein said thiocyanate compound comprises sodium thiocyanate.

29. The composition of claim 22 wherein said thiocyanate compound comprises potassium thiocyanate.

References Cited

UNITED STATES PATENTS

| | | | |
|---|---|---|---|
| 2,700,020 | 1/1955 | Pierce | 204—52 |
| 2,938,805 | 5/1960 | Agens | 106—1 |
| 3,075,856 | 1/1963 | Lukes | 106—1 |
| 3,222,195 | 12/1965 | Pearlstein | 106—1 |
| 3,234,031 | 2/1966 | Zirngiebl et al. | 106—1 |

DONALD J. ARNOLD, *Primary Examiner.*

ALEXANDER H. BRODMERKEL, *Examiner.*

J. CARSON, L. B. HAYES, *Assistant Examiners.*